Patented Apr. 1, 1930

1,752,358

UNITED STATES PATENT OFFICE

OSCAR G. WINZER, OF TROY, KANSAS

PAINT AND VARNISH REMOVER

No Drawing.   Application filed November 16, 1928.   Serial No. 320,001.

This invention relates to a composition primarily adapted for removing old paint and varnish from surfaces, but capable of use as a cleanser and as a renewer for the paint of varnish finishes of surfaces.

The object of the present invention is to provide a composition of the above kind which is extremely efficient in use.

In carrying out this invention, I provide a solution or liquid mixture consisting of the following ingredients in substantially the proportions specified:

| | |
|---|---|
| Denatured alcohol | 16 parts |
| Spirits of turpentine | 2 parts |
| Benzol | 2 parts |
| Oil of wintergreen (synthetic) | 1 part |
| Solution of turpentine and permanent red | $\frac{1}{10}$ part |

The above ingredients are thoroughly mixed together, and, by reason of their proportions, a most thorough mixture or uniform solution is had which is very efficient in use. In fact, I have found by practical experience that any appreciable variation from these proportions will result in a much less uniform and less efficient composition.

This solution may be applied to the painted or varnished surface by means of a brush or a rag. The effect is to loosen the dirt so that it may be rubbed off, to soften the paint or varnish so that it may be rubbed to fill cracks and thereby renew or restore the smooth surface, or to soften the paint or varnish so that it may be wiped off of the surface, depending on the amount of the solution used, the length of time it is allowed to remain on the surface before wiping the latter, and severity of the wiping or rubbing operation.

The term "permanent red" as used herein, refers to red lead ground in linseed oil.

What I claim as new is:—

A solution of the character described consisting of a mixture of 16 parts of denatured alcohol, 2 parts of spirits of turpentine, 2 parts of benzol, 1 part of oil of wintergreen, and $\frac{1}{10}$ part of a solution of turpentine and permanent red.

In testimony whereof I affix my signature.

OSCAR G. WINZER.